United States Patent
Lee et al.

(10) Patent No.: US 12,509,844 B2
(45) Date of Patent: Dec. 30, 2025

(54) DEVICE FOR EVALUATING INTEGRITY OF UNDERGROUND STRUCTURE BY USING ELECTROMAGNETIC WAVE

(71) Applicants: Korea University Research and Business Foundation, Seoul (KR); DL CONSTRUCTION CO., Incheon (KR); SEOYOUNG ENGINEERING CO., LTD., Seongnam-si (KR); BACKYOUNG G&C CO., LTD., Seoul (KR)

(72) Inventors: Jong-Sub Lee, Seoul (KR); Jung-Doung Yu, Suwon-si (KR); Seok-Gyu Jeong, Seoul (KR); Dong-Soo Lee, Seoul (KR)

(73) Assignees: Korea University Research and Business Foundation, Seoul (KR); DL CONSTRUCTION CO., Incheon (KR); SEOYOUNG ENGINEERING CO., LTD., Seongnam-si (KR); BACKYOUNG G&C CO., LTD., Seoul (KR)

( * ) Notice: Subject to any disclaimer, the term of this patent is extended or adjusted under 35 U.S.C. 154(b) by 53 days.

(21) Appl. No.: 18/576,987

(22) PCT Filed: May 13, 2022

(86) PCT No.: PCT/KR2022/006869
§ 371 (c)(1),
(2) Date: Jan. 5, 2024

(87) PCT Pub. No.: WO2023/286999
PCT Pub. Date: Jan. 19, 2023

(65) Prior Publication Data
US 2025/0084608 A1    Mar. 13, 2025

(30) Foreign Application Priority Data
Jul. 14, 2021    (KR) ........................ 10-2021-0092385

(51) Int. Cl.
*E02D 33/00*    (2006.01)
*G01R 27/16*    (2006.01)
*G01V 3/12*    (2006.01)

(52) U.S. Cl.
CPC ............ *E02D 33/00* (2013.01); *G01R 27/16* (2013.01); *G01V 3/12* (2013.01)

(58) Field of Classification Search
USPC ....................................................... 324/347
See application file for complete search history.

(56) References Cited

U.S. PATENT DOCUMENTS

2017/0247017 A1*  8/2017  Lee ...................... B60R 25/302

FOREIGN PATENT DOCUMENTS

JP    2004-258041 A    9/2004
JP    2012-112982 A    6/2012
(Continued)

*Primary Examiner* — Farhana A Hoque
(74) *Attorney, Agent, or Firm* — NSIP Law

(57) ABSTRACT

A device for evaluating integrity of an underground structure by using electromagnetic waves includes a plurality of main reinforcing bars arranged in a vertical direction in an underground structure, a plurality of measurement cables extending vertically to be adjacent to the main reinforcing bars, respectively, at least one impedance change unit which is provided on each of the measurement cables, is electrically connected to the measurement cable, and has a characteristic impedance different from a characteristic impedance of the measurement cable, and an electromagnetic wave measurement unit for detecting a change point of a characteristic impedance as a defect point of the underground structure by providing an electromagnetic wave by using, as a signal transmission line, one of the plurality of measurement cables (Continued)

and one of the plurality of main reinforcing bars, or one pair of measurement cables selected from the plurality of measurement cables.

9 Claims, 9 Drawing Sheets

(56) References Cited

FOREIGN PATENT DOCUMENTS

| | | |
|---|---|---|
| JP | 2012-127908 A | 7/2012 |
| JP | 2013-92510 A | 5/2013 |
| KR | 10-1897905 B1 | 9/2018 |

\* cited by examiner

[FIG. 1]
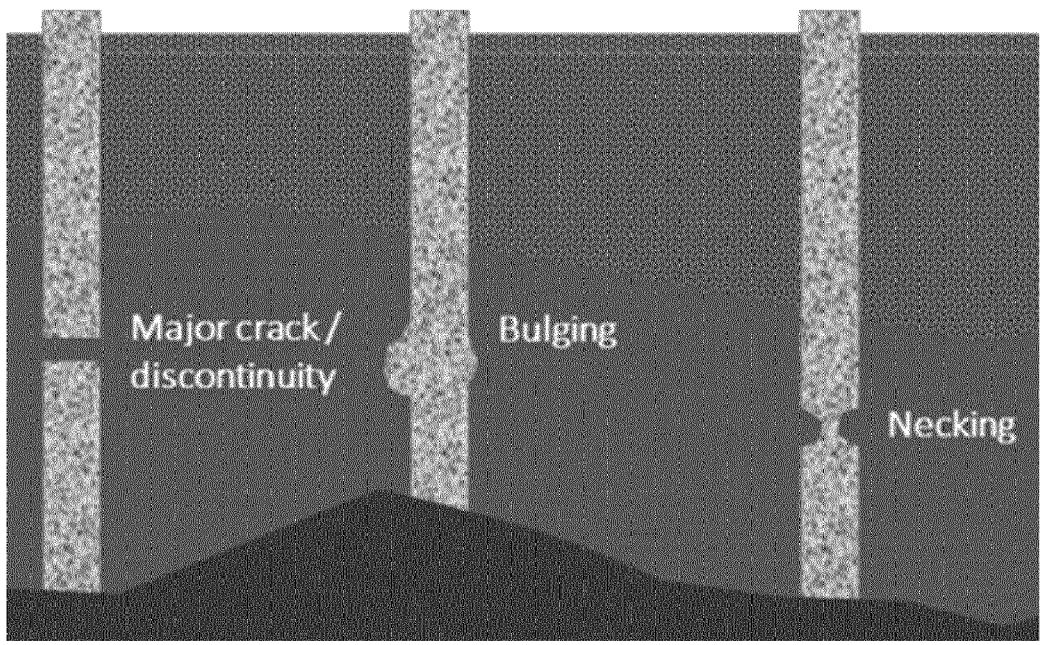

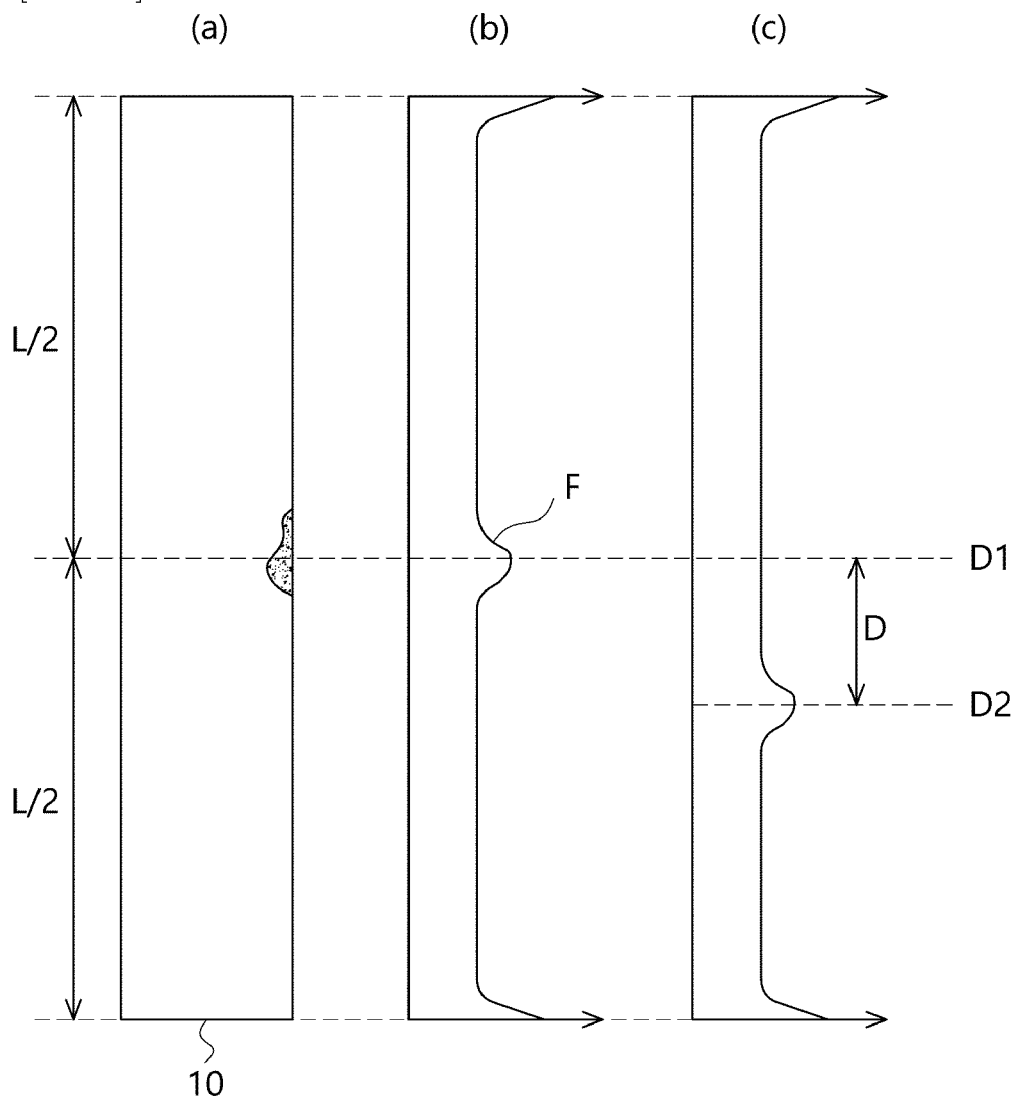

[FIG. 3]

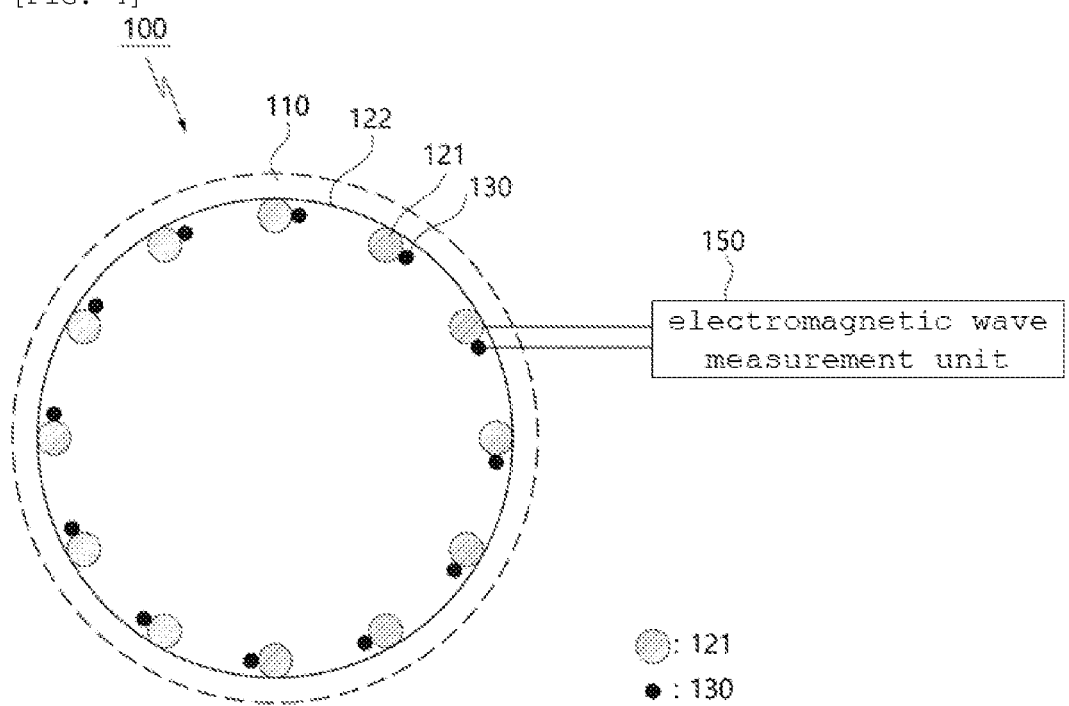

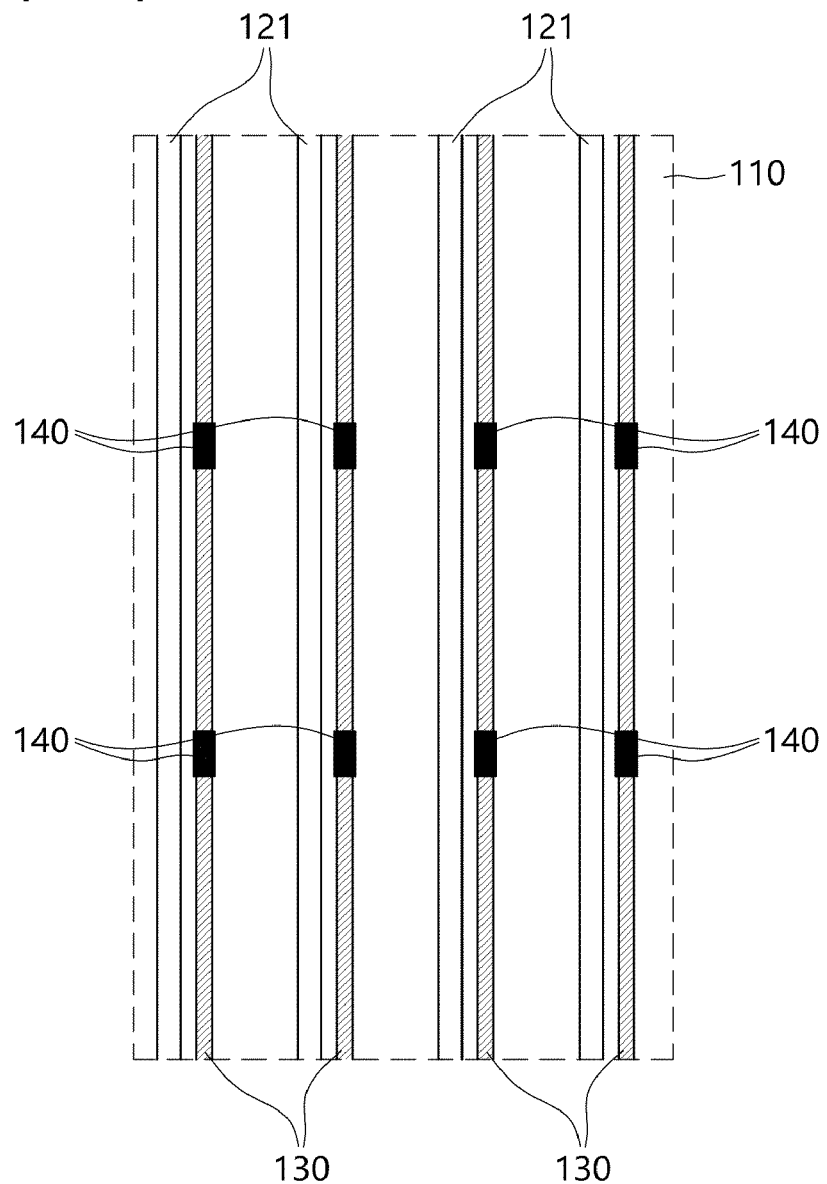
[FIG. 5]

[FIG. 6]
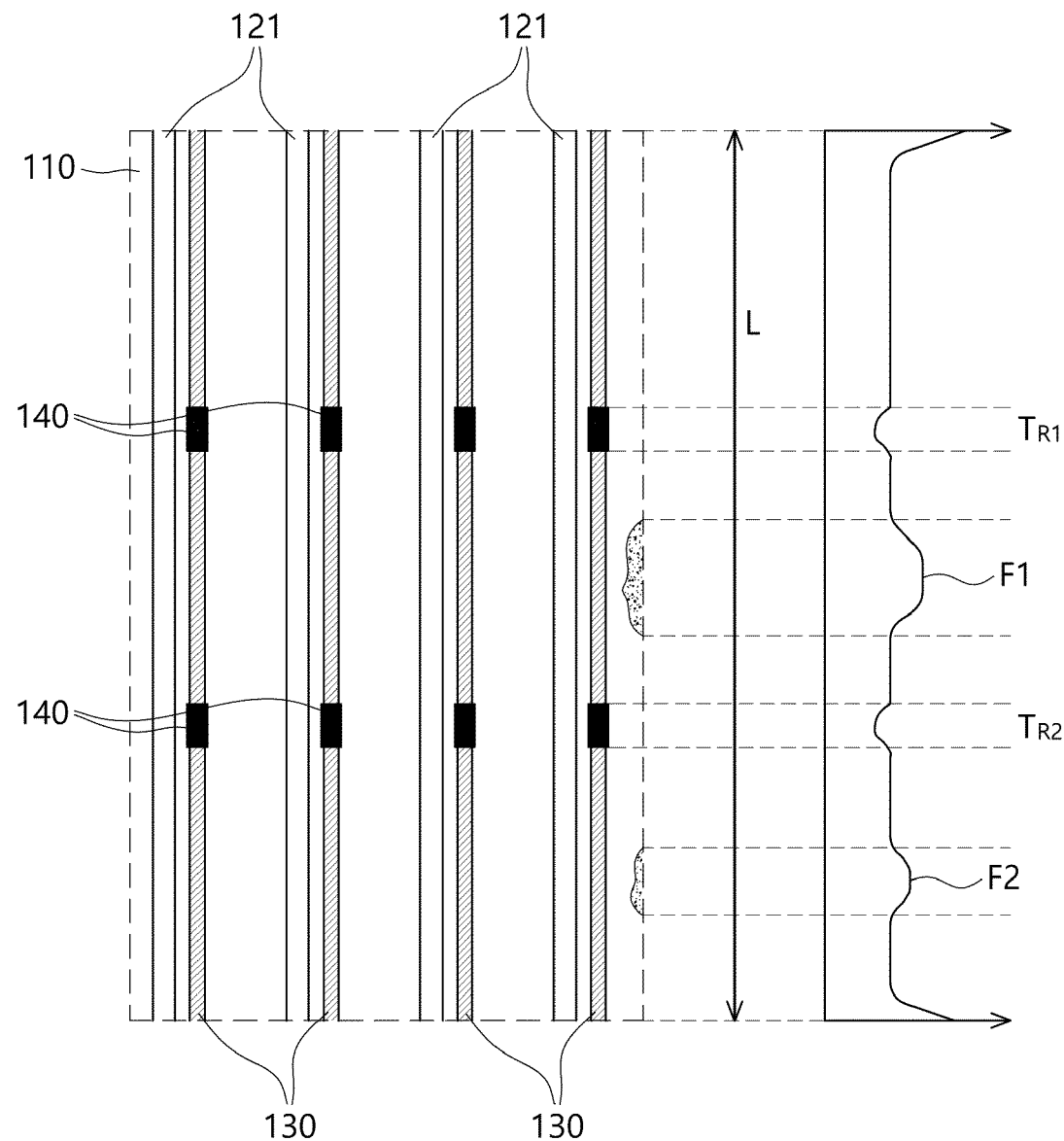

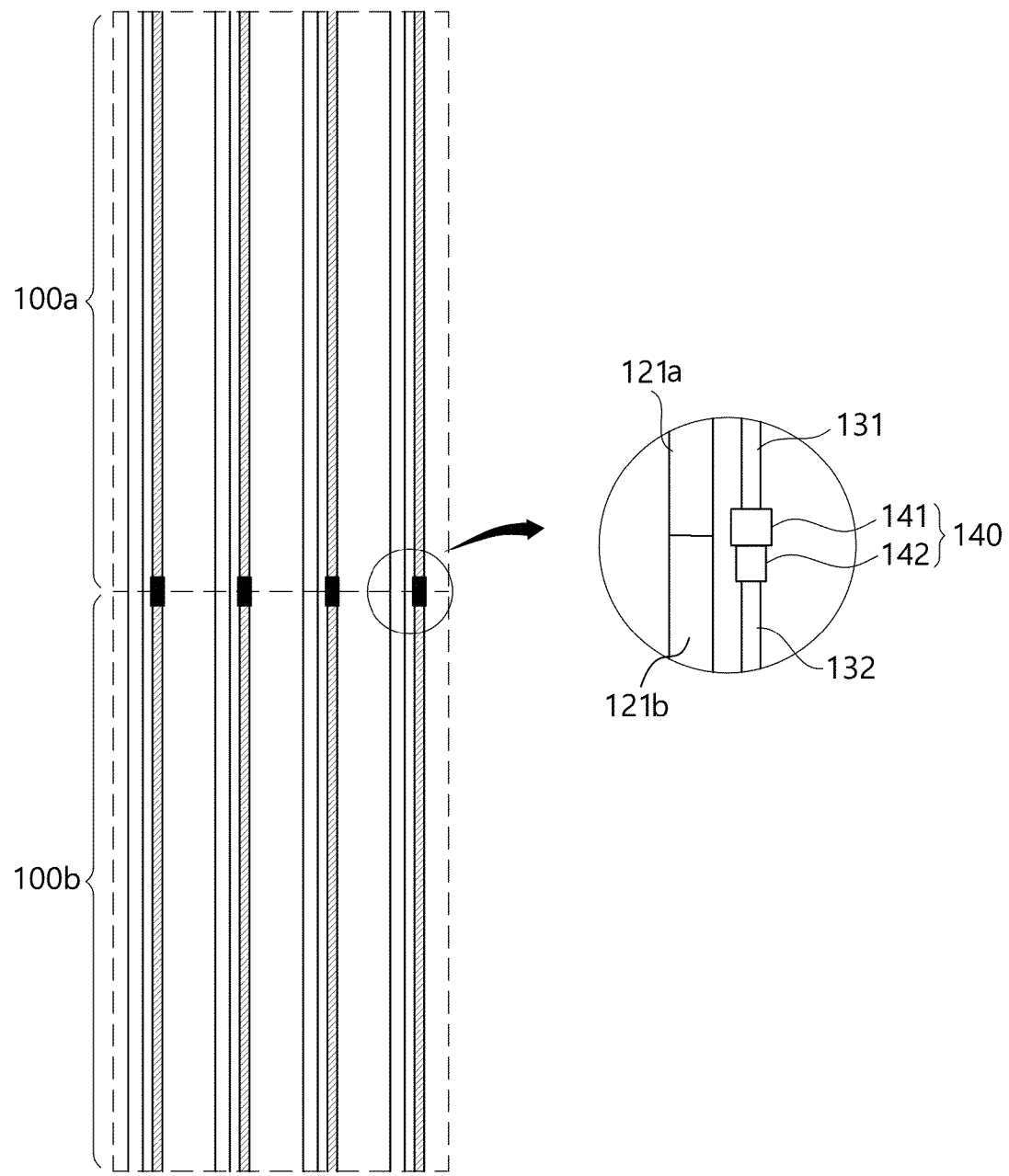

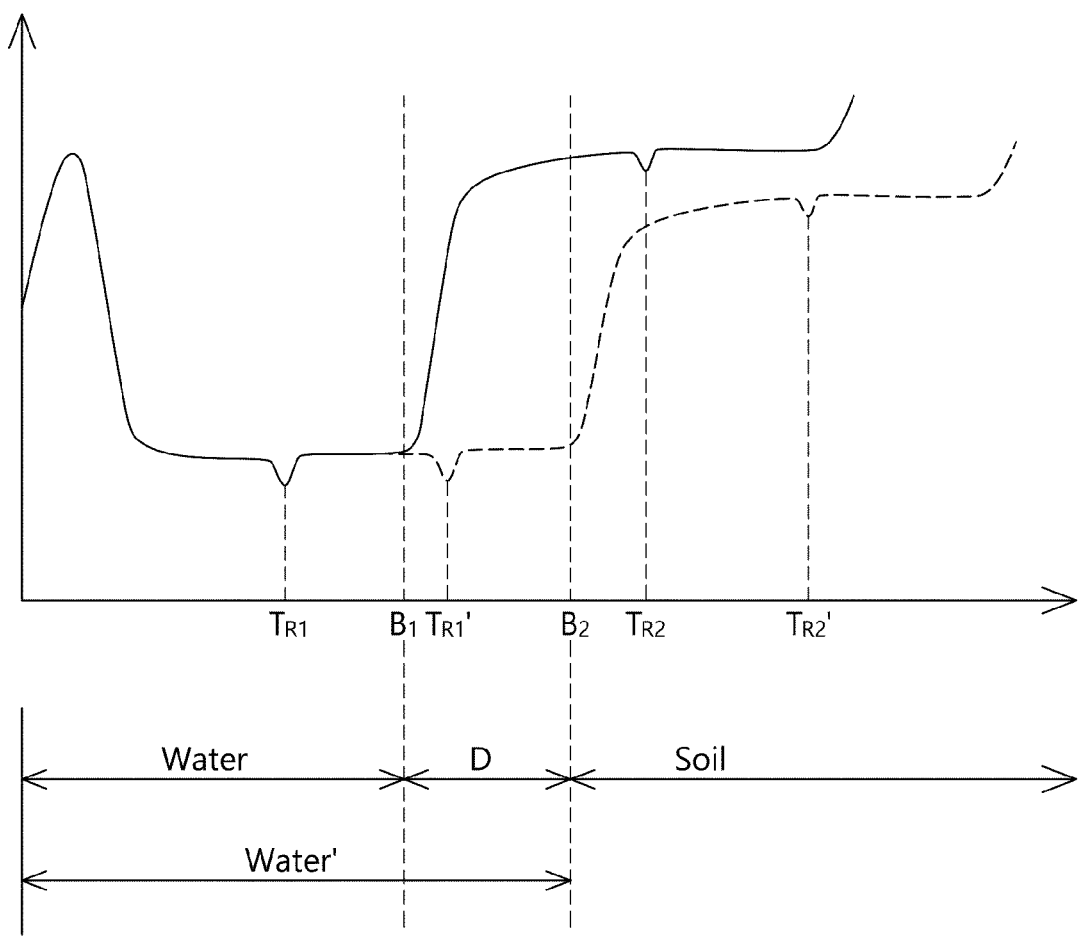
[FIG. 8]

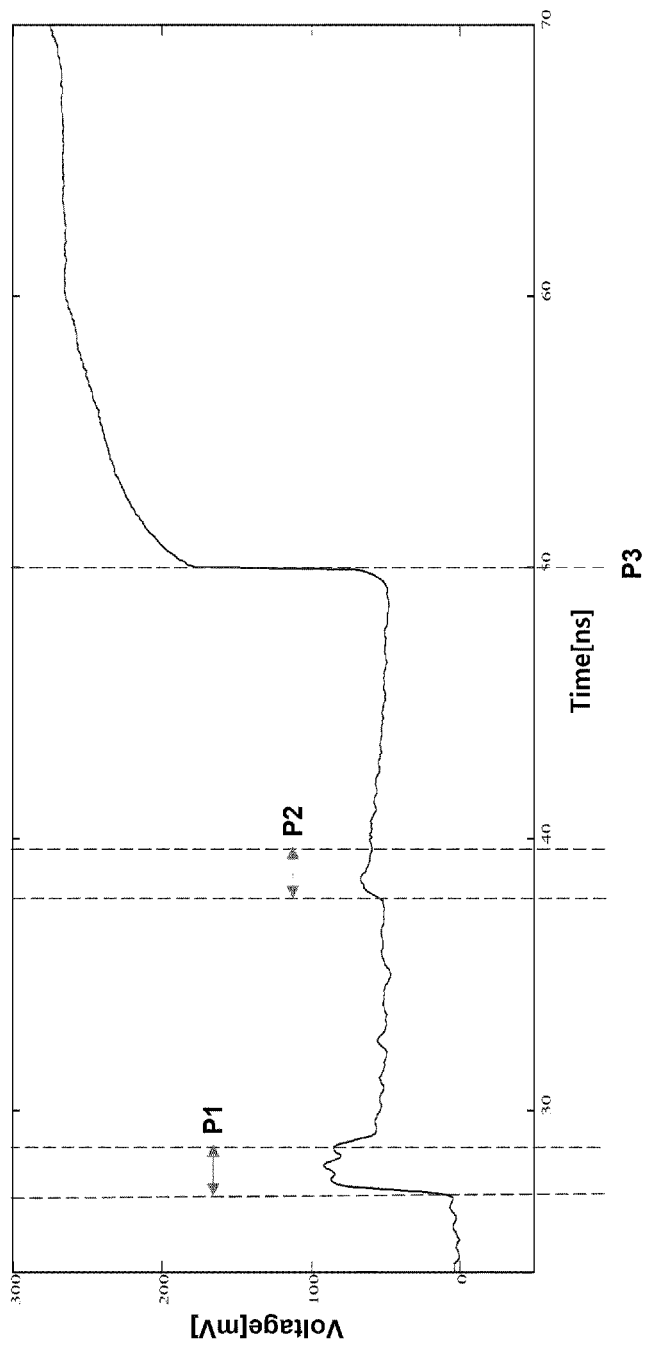
[FIG. 9]

DEVICE FOR EVALUATING INTEGRITY OF UNDERGROUND STRUCTURE BY USING ELECTROMAGNETIC WAVE

CROSS REFERENCE TO RELATED APPLICATIONS

This application is a U.S. National Stage Application of International Application No. PCT/KR2022/006869, filed on May 13, 2022, which claims the benefit under 35 USC 119(a) and 365(b) of Korean Patent Application No. 10-2021-0092385, filed on Jul. 14, 2021, in the Korean Intellectual Property Office, the entire disclosure of which is incorporated herein by reference for all purposes.

TECHNICAL FIELD

The present disclosure relates to a device for evaluating integrity of an underground structure by using electromagnetic waves and, more particularly, relates to a device for evaluating integrity of an underground structure by using electromagnetic waves, wherein the device can evaluate a defect in an underground structure, such as a pile foundation, without excavating a surrounding ground.

BACKGROUND ART

A pile foundation is used to install a structure on ground with weak bearing capacity. A pile foundation is a type of deep foundation that ensures the stability of a structure by transmitting the load of the structure to a deep support layer. A pile foundation is most often used as a deep foundation since the pile foundation has excellent bearing capacity and is excellent in constructability and economic efficiency.

During the construction of a pile foundation, defects may occur in the pile foundation due to separation of concrete materials, loss of cement, inclusion of foreign substances, and collapse of hollow walls, etc. FIG. 1 is a view illustrating examples of defects that may occur in a pile foundation, wherein the examples of cracks, discontinuities, bulging, and necking are illustrated.

Sonic echo and crosshole sonic logging (CSL) methods are widely used as techniques to evaluate defects occurring in such a pile foundation.

However, in the case of the sonic echo method, when the length-to-diameter ratio (L/D) of a pile exceeds 30 to 60, there is a limit to the depth of investigation, and when multiple defects occur in the pile, it is difficult to accurately determine the location of all defects. In addition, defects in a pile foundation can only be identified in a longitudinal direction thereof, and it is difficult to identify the defects in a circumferential direction thereof.

In the case of the crosshole sonic logging method, since multiple holes for inspection are required to be installed in a pile foundation, the body of the pile foundation and a surrounding ground may be damaged, and there is the disadvantage of being less economical in terms of time and cost.

Accordingly, the applicant of this application has proposed "PILE INTEGRITY TESTING APPARATUS FOR USING ELECTROMAGNETIC WAVE" disclosed in Korean Patent No. 10-1897905. The pile integrity testing apparatus proposes a technology that can evaluate a plurality of defects occurring in a pile foundation over the entire length of the pile foundation by arranging wires along rebars.

The wires and the rebars of the pile foundation as a signal transmission line of electromagnetic waves are used, and by using the propagation characteristics of electromagnetic waves, defects occurring in the pile foundation can be investigated, so it is possible to identify the location of defects in the pile foundation without excavating a surrounding ground, and it is possible to distinguish the location of the defects even when multiple defects occur.

However, in the case of the pile integrity testing apparatus disclosed in the above Korean paten, there is limitation in detecting the absolute location of a defect. To be more specific, the pile integrity testing apparatus disclosed in the above Korean Patent uses the round-trip travel time of the electromagnetic wave reflected and returned from a point at which a characteristic impedance changes when an electromagnetic wave propagates inside a pile foundation to detect a defect point thereof, but has a problem in that it is difficult to measure the absolute position of the defect point since a measured value is only one round-trip travel time.

Referring to FIG. 2, an electromagnetic wave propagating along wire mounted in a pile foundation is reflected and returned from a defect point at which characteristic impedance changes to measure the round-trip travel time of the electromagnetic wave. That is, when the known speed of the electromagnetic wave and the round-trip travel time are known, it is possible to determine the position of the defect point.

As illustrated in FIG. 2(a), assuming that the length of the pile foundation is L and that a defect point is a center point of the pile foundation in a longitudinal direction thereof, the round-trip travel time of an electromagnetic wave reflected from the defect point and the speed of the electromagnetic wave are used and the position of the detect point can be detected as illustrated in FIG. 2(b).

A graph illustrated in FIG. 2(b) illustrates the measurement of using a method disclosed in the above Korean Patent, and this measurement was made assuming that an electromagnetic wave propagates at a constant speed along the pile foundation. That is, a value measured through the pile integrity testing apparatus disclosed in the above Korean Patent is the round-trip travel time of an electromagnetic wave, and in order to detect the position of a defective part by using the round-trip travel time, the speed of the electromagnetic wave is preset as a constant.

However, the speed of an electromagnetic wave inside the pile foundation is not constant, so the above assumption has a limitation in finding an exact defect position. The actual speed of an electromagnetic wave is calculated as [Equation 1].

$$V = \frac{C_0}{\sqrt{k}} \qquad \text{[Equation 1]}$$

Here, V is the speed of electromagnetic waves in a specific material, k is a dielectric constant of a corresponding material, and $C_0$ is the speed of electromagnetic waves in air or a vacuum.

As in [Equation 1], the actual speed of an electromagnetic wave varies depending on the dielectric constant of a material. Since a dielectric constant is not constant along wire mounted in a pile foundation, the speed of an electromagnetic wave varies along the pile foundation.

These causes arise from external causes as well as internal causes of a pile foundation. That is, as in an example illustrated in FIG. 3, the length of the pile foundation ranges from as short as 10 m to as long as over 80 m. It is not realistic to assume that concrete is poured uniformly over the entire length of the pile foundation. Not only is concrete poured unevenly, but the degree of the unevenness is also unknown. FIG. 3 is a view illustrating an example of a steel cage applied to the construction of a conventional pile foundation.

For example, bleeding that occurs due to gravity, that is, bleeding that occurs due to heavy gravel sinking downward, and sliming of a pile, etc. are one of causes that cause concrete to be placed unevenly.

When concrete is placed unevenly, dielectric constant, which is the electrical property of the concrete, changes, so the speed of electromagnetic wave changes inside the pile foundation.

In addition, the ground on which a pile foundation is constructed may be composed of ground layers of various materials. For example, the dielectric constant of the ground varies depending on a clay layer, a sandy soil layer, the presence or absence of groundwater, the water content of the ground, and the strength of the ground. Since the speed of electromagnetic waves is affected by a surrounding dielectric constant, the speed of electromagnetic waves changes due to changes in the characteristics of the gravity direction of the ground in the pile foundation is placed.

As a result, assuming that an electromagnetic wave speed is constant, when the position of a defective part is measured by using only the round-trip travel time of the electromagnetic wave, the position of the defective part illustrated in FIG. 2(a) does not appear as in the graph illustrated in FIG. 2(b).

For example, when an upper dielectric constant relative to the defect position in the pile foundation illustrated in FIG. 2(a) is smaller than a lower dielectric constant relative to the defect position and the speed of an electromagnetic wave becomes faster, the defect position of the pile foundation illustrated in FIG. 2(a) will be measured to be different from an actual defect position as illustrated in FIG. 2(a).

To summarize, the conventional pile integrity testing apparatus assumes that the speed of the electromagnetic wave is constant and only measures a relative position based on the round-trip travel speed of the electromagnetic wave, but is not able to detect the absolute position of a defect portion within the pile foundation.

DISCLOSURE

Technical Problem

Accordingly, the present disclosure has been made to solve the above problems occurring in the prior art, and is intended to propose a device for evaluating integrity of an underground structure by using electromagnetic waves, wherein the device can the absolute position of a defective part of the underground structure when evaluating the soundness of the underground structure, such as a pile foundation, by using electromagnetic waves.

In addition, the present disclosure is intended to propose a device for evaluating integrity of an underground structure, wherein the device can more accurately measure the degree of the scour of an underwater pile foundation.

Technical Solution

The above objectives are accomplished by a device for evaluating integrity of an underground structure by using electromagnetic waves, the device including: a plurality of main reinforcing bars arranged in a vertical direction in an underground structure; a plurality of measurement cables extending in the vertical direction to be adjacent to the main reinforcing bars, respectively; at least one impedance change unit which is provided on each of the measurement cables, is electrically connected to the measurement cable, and has a characteristic impedance different from a characteristic impedance of the measurement cable; and an electromagnetic wave measurement unit for detecting a change point of a characteristic impedance as a defect point of the underground structure by providing an electromagnetic wave by using, as a signal transmission line, one of the plurality of measurement cables and one of the plurality of main reinforcing bars, or one pair of measurement cables selected from the plurality of measurement cables, wherein the electromagnetic wave measurement unit determines a defect position in the vertical direction of the defect point by using, as a reference point, a point at which a characteristic impedance is changed by the impedance change unit.

Here, each of the measurement cables may have at least two unit cables, and the impedance change unit may include a first connector installed on an end of one unit cable of the unit cables, and a second connector installed on an end of one remaining unit cable of the unit cables, which is connected to the one unit cable, with the second connector being configured to electrically connect the one unit cable and the one remaining unit cable to each other through coupling of the second connector with the first connector.

In addition, the underground structure may be buried inside a seabed through seawater or freshwater, and the electromagnetic wave measurement unit may determine a boundary surface between a water section of the seawater or freshwater and a soil section under the seabed by using difference in a characteristic impedance between the water section and the soil section, and may determine whether there is scour and a degree of scour on the boundary surface according to a change of the boundary surface on a basis of the reference point.

In addition, the device may further include: a plurality of tie bars which surrounds an outside of the plurality of main reinforcing bars in a circumferential direction and is spaced apart from each other in the vertical direction.

In addition, the underground structure may include a plurality of unit steel cages disposed in the vertical direction and concrete poured into the plurality of unit steel cages, wherein each of the unit steel cages may include a plurality of unit main reinforcing bars disposed in the vertical direction in the underground structure, a plurality of unit tie bars which surrounds an outside of the plurality of unit main reinforcing bars in the circumferential direction and is spaced apart from each other in the vertical direction, and a plurality of unit cables extending in the vertical direction to be adjacent to the unit main reinforcing bars, respectively, wherein the unit main reinforcing bars at corresponding positions of the unit steel cages neighboring in the vertical direction may be connected to each other to constitute the main reinforcing bar; the plurality of unit tie bars may constitute the tie bar; the impedance change unit may electrically connect the unit cables at corresponding positions of the unit steel cages neighboring in the vertical direction; and the plurality of unit cables connected to each other in the vertical direction may constitute the one measurement cable.

In addition, the electromagnetic wave measurement unit may measure a round-trip travel time of an electromagnetic wave, which is provided through the signal transmission line, reflected and returned from a point at which a characteristic impedance changes and may detect the change point of the characteristic impedance.

In addition, the measurement cable may be installed inside or outside the tie bar, or both inside and outside the tie bar relative to the circumferential direction.

In addition, a combination of the measurement cable and the main reinforcing bar disposed inside or outside the tie bar, or a combination of the measurement cable disposed inside the tie bar and the measurement cable disposed outside the tie bar may constitute the signal transmission line.

In addition, the measurement cable and the main reinforcing bar or the measurement cables facing each other relative to a center of a circumference of the underground structure may constitute the signal transmission line so that integrity inside the underground structure is evaluated.

Advantageous Effects

According to the device of the present disclosure having the above configuration which evaluates the integrity of an underground structure, when evaluating the integrity of an underground structure, such as a pile foundation, by using electromagnetic waves, the impedance change unit having different characteristic impedance can be applied as a reference point, thereby detecting the absolute position of a defective part in the underground structure.

In addition, it is possible to more accurately measure whether there is scour and the degree of scour on an underwater pile foundation.

DESCRIPTION OF DRAWINGS

FIG. 1 is a view illustrating examples of defects which may occur in a pile foundation, FIG. 2 is a view illustrating measurement errors occurring in a conventional pile integrity evaluation device, FIG. 3 is a view illustrating an example of a steel cage applied to the construction of a conventional pile foundation, FIGS. 4 and 5 are views illustrating the configuration of the device for evaluating integrity of an underground structure by using electromagnetic waves according to the embodiment of the present disclosure, FIG. 6 is a view illustrating the measurement principle of the device for evaluating integrity of an underground structure by using electromagnetic waves according to the embodiment of the present disclosure, FIG. 7 is a view illustrating the configuration of a device for evaluating integrity of an underground structure by using electromagnetic waves according to another embodiment of the present disclosure, FIG. 8 is a graph illustrating an application example of the device for evaluating integrity of an underground structure by using electromagnetic waves according to the embodiment of the present disclosure, and FIG. 9 is a graph illustrating the result of a measurement experiment performed by using the device for evaluating integrity of an underground structure by using electromagnetic waves according to the embodiment of the present disclosure.

BEST MODE

The present disclosure relates to a device for evaluating integrity of an underground structure by using electromagnetic waves, the device including: a plurality of main reinforcing bars arranged in a vertical direction in an underground structure; a plurality of measurement cables extending in the vertical direction to be adjacent to the main reinforcing bars, respectively; at least one impedance change unit which is provided on each of the measurement cables, is electrically connected to the measurement cable, and has a characteristic impedance different from a characteristic impedance of the measurement cable; and an electromagnetic wave measurement unit for detecting a characteristic impedance change point as a defect point of the underground structure by providing an electromagnetic wave by using, as a signal transmission line, one of the plurality of measurement cables and one of the plurality of main reinforcing bars, or one pair of measurement cables selected from the plurality of measurement cables, wherein the electromagnetic wave measurement unit determines a defect position in the vertical direction of the defect point by using, as a reference point, a point at which a characteristic impedance is changed by the impedance change unit.

MODE FOR INVENTION

The advantages and features of the present disclosure and methods for achieving them will become clear by referring to embodiments described in detail below along with the accompanying drawings. However, the present disclosure is not limited to the embodiments disclosed below, but may be implemented in various different forms. These embodiments are merely provided to ensure that the present disclosure is complete and to fully inform those skilled in the art of the scope of the present disclosure, and the present disclosure is defined by the scope of the claims. Like reference numerals refer to like elements throughout the specification.

Hereinafter, embodiments according to the present disclosure will be described in detail with reference to the accompanying drawings. Prior to the description of the present disclosure, "an underground structure" of the present disclosure refers to a structure whose integrity is evaluated by an integrity evaluation device according to the present disclosure, wherein the underground structure is formed by pouring concrete 110 into a steel cage after the steel cage formed by including the main reinforcing bar 121 to be described later is inserted into the ground. Hereinafter, the underground structure will be described as an example of a pile foundation.

FIGS. 4 and 5 are views illustrating the configuration of the device for evaluating integrity of an underground structure by using electromagnetic waves according to the embodiment of the present disclosure. FIG. 4 illustrates a top plan view of the underground structure in the integrity evaluation device according to the embodiment of the present disclosure, and FIG. 5 illustrates a side view of the underground structure in the integrity evaluation device according to the embodiment of the present disclosure. FIG. 5 illustrates a cross section, but is not an actual cross-sectional view, and is a schematic illustration centered on the measurement cable 130 and the main reinforcing bar 121 when viewed from the side.

Referring to FIGS. 4 and 5, the integrity evaluation device according to the embodiment of the present disclosure may include a plurality of main reinforcing bars 121, a plurality of measurement cables 130, an impedance change unit 140, and an electromagnetic wave measurement unit 150. Here, the plurality of main reinforcing bars 121 and the tie bars 122 constitute a steel cage, and after the steel cage is buried in the ground, concrete 110 is poured into the steel cage to form the underground structure.

The plurality of main reinforcing bars 121 is disposed in a vertical direction in the underground structure. As illustrated in FIG. 4, when the underground structure is a cylindrical pile foundation, the plurality of main reinforcing bars 121 is disposed to be spaced apart from each other in a circumferential direction. In addition, a plurality of tie bars 122 is spaced apart in a vertical direction from each other by circumferentially surrounding the outside of the plurality of main reinforcing bars 121, and the plurality of main reinforcing bars 121 and the plurality of tie bars 122 are connected to each other to form the steel cage.

As illustrated in FIGS. 4 and 5, the plurality of measurement cables 130 extend vertically to be adjacent to the main reinforcing bars 121, respectively. As illustrated in FIG. 4, one measurement cable 130 is disposed to be adjacent to one main reinforcing bar 121 and is disposed inside the tie bar 122.

As illustrated in FIG. 5, the impedance change unit 140 is provided on each of the measurement cables 130. In addition, each impedance change unit 140 is maintained to be electrically connected to a corresponding measurement cable 130. Here, the impedance change unit 140 is provided to have characteristic impedance different from the characteristic impedance of the measurement cable 130.

The electromagnetic wave measurement unit 150 provides an electromagnetic wave by using one of the plurality of measurement cables 130 and one of the plurality of main reinforcing bars 121 as a signal transmission line. Alternatively, the electromagnetic wave measurement unit 150 provides an electromagnetic wave by using one pair of measurement cables 130 selected from the plurality of measurement cables 130 as a signal transmission line.

In addition, the electromagnetic wave measurement unit 150 detects the change point of characteristic impedance as the defect point of the underground structure on the basis of the measurement result of the electromagnetic wave provided through the signal transmission line, and evaluates the integrity of the underground structure.

More specifically, the electromagnetic wave measurement unit 150 measures the round-trip travel time of the electromagnetic wave, which is provided through the signal transmission line, reflected and returned from a point at which characteristic impedance changes and detects the change point of the characteristic impedance.

In addition, based on the speed of the electromagnetic wave, a distance to the change point of the characteristic impedance changes is calculated by using the relationship of speed=distance/time. However, as described above, since this type of position measurement is performed under the assumption that the speed of electromagnetic waves is constant within the underground structure, an error may occur in an absolute position of a defective part.

Accordingly, the electromagnetic wave measurement unit 150 according to the present disclosure determines a defect position in the vertical direction of the defect point by using, as a reference point, a point at which characteristic impedance is changed by the impedance change unit 140 provided on each of the measurement cables 130.

More detailed description will be made with reference to FIG. 6. In the assumption that the length of the underground structure in the vertical direction is L, two impedance change units 140 are installed on each of the measurement cables 130, and the two impedance change units 140 are installed at equal intervals. In addition, as an example, detects occur in a section between the two impedance change units and a section under a second impedance change, respectively, and each of the defects occurs the middle part of each of the sections.

According to the above configuration, when the electromagnetic wave measurement unit 150 applies an electromagnetic wave through one signal transmission line, the measurement result based on the round-trip travel time described above shows that impedance change points $T_{R1}$ and $T_{R2}$ according to two impedance change units 140 and impedance change points F1 and F2 according to two defective parts can be detected.

Here, when the impedance change points $T_{R1}$ and $T_{R2}$ according to the two impedance change units 140 are used as reference points, absolute positions of the impedance change points F1 and F2 according to the defective parts, respectively, can be measured relative to the reference points.

That is, in the case of the signal transmission line, impedance changes occur at the opposite ends of the underground structure in the vertical direction, so that the positions of the opposite ends can be measured, and the reference points are standards for dividing an interval between the opposite ends into equal intervals.

Accordingly, even when a length between the introduction side of the underground structure and the first reference point $T_{R1}$, a length between the first reference point $T_{R1}$ and the second reference point $T_{R2}$, and a length between the second reference point $T_{R1}$ and an end of the underground structure are changed on a measurement graph due to the speed change of an electromagnetic wave propagating inside the underground structure 100, each of the lengths is L/3. That is, when a scale is corrected so that each of the lengths is equal, the position of the impedance change point F1 or F2 according to each defective part is corrected, so the absolute position of the defective part can be measured.

According to the above configuration, due to changes in the speed of electromagnetic waves caused by causes such as bleeding or sliming due to uneven placement of the concrete 110 and the characteristics of the ground layer in which the underground structure is buried, measurement of the absolute position of a defective part is difficult. To solve this problem, a reference point is measured through the impedance change unit 140 so that the absolute position of the defective part inside the underground structure 100 can be measured.

FIG. 7 is a view illustrating the configuration of the device for evaluating integrity of an underground structure by using electromagnetic waves according to another embodiment of the present disclosure.

Referring to FIG. 7, the measurement cable 130 of the integrity evaluation device according to the another embodiment of the present disclosure includes at least two unit cables 131 and 132. FIG. 7 illustrates that two unit cables 131 and 132 constitute one measurement cable 130, but at least three unit cables 131 and 132 may constitute one measurement cable 130.

The impedance change unit 140 may include a first connector 141 installed on an end of one unit cable 131 or 132, and a second connector 142 installed on an end of another unit cable 131 or 132 connected to the one unit cable 131 or 132.

Here, the second connector 142 and the first connector 141 are connected to each other to electrically connect one unit cable 131 or 132 and another unit cable 131 or 132 to each other. That is, one pair of unit cables 131 and 132 adjacent to each other is electrically connected to each other by the connection of the first connector 141 with the second connector 142.

The impedance change unit 140 including the first connector and the second connector 142 electrically connects unit cables 131 and 132 to each other, and the first connector 141 and the second connector 142 have characteristic impedance different from the characteristic impedance of the unit cables 131 and 132, and thus may function as the impedance change unit 140.

Meanwhile, as described above, the underground structure includes the steel cage including the plurality of main reinforcing bars 121 and the plurality of tie bars 122, and the concrete 110.

The main reinforcing bar 121 is generally manufactured to have length of 12 m, and when an underground structure longer than 12 m is manufactured, unit steel cages 100a and 100b respectively having lengths of 12 m are connected to each other in the vertical direction and used.

Here, the underground structure according to the embodiment of the present disclosure may include the plurality of unit steel cages 100a and 100b disposed in the vertical direction and the structure of the concrete 110 poured into the plurality of unit steel cages 100a and 100b.

That is, unit steel cages are manufactured to correspond to the length of the main reinforcing bar 121, and are disposed in a vertical direction to form an entire steel cage. Next, concrete 110 is poured into the entire steel cage, and the underground structure is formed.

Here, the unit steel cage 100a or 100b may include a plurality of unit main reinforcing bars 121a and 121b, a plurality of unit tie bars 122 (not shown), and a plurality of unit cables 131 and 132.

The unit main reinforcing bars 121a and 121b are disposed vertically in the underground structure. The unit tie bars 122 circumferentially surround the outside of the unit main reinforcing bars 121a and 121b and are vertically spaced apart from each other.

The unit cables 131 and 132 vertically extend to be adjacent to the unit main reinforcing bars 121a and 121b, respectively, and are disposed inside the unit tie bar 122.

In addition, unit main reinforcing bars 121a and 121b of corresponding positions of unit steel cages 100a and 100b neighboring vertically are connected to each other, and constitute of an entire main reinforcing bar 121. In addition, the plurality of unit tie bars 122 constitutes the tie bar 122 of the underground structure.

Here, the impedance change unit 140 may perform the electrical connection of unit cables 131 and 132 of corresponding positions of unit steel cages 100a and 100b neighboring in a vertical direction. As described above, the impedance change unit 140 includes the first connector 141 and the second connector 142 and may be provided to connect the unit cable 131 with the unit cable 132. In addition, the unit cables 131 and 132 connected to each other constitute one measurement cable 130.

Through the above configuration, when unit cables 131 and 132 of the unit steel cages 100a and 100b adjacent to each other are connected to each other in the vertical direction, the unit cables 131 and 132 are connected to each other by the first connector 141 and the second connector 142, and accordingly, in the manufacturing of the underground structure, the measurement cable 130 having a long length in the vertical direction can be installed more easily.

To be more specific, when the length of the main reinforcing bar 121 is generally 12 m and at least two unit steel cages 100a and 100b are disposed in the vertical direction, one cable cannot be realistically fit for the main reinforcing bar.

Usually, after one unit steel cage 100a or 100b is inserted into a perforated hole, another unit steel cage 100a or 100b is inserted into the hole. The work of disposing one cable to be adjacent to each main reinforcing bar 121 is realistically difficult. On the other hand, in the case of the unit steel cage 100a or 100b according to the present disclosure, one pair of unit cables 131 and 132 adjacent to each other in the vertical direction is connected to each other by the connection of the first connector 141 with the second connector 142, thereby increasing the ease of work, and further, a first cable and a second cable simultaneously perform the function of the impedance change unit 140, thereby improving measurement accuracy.

Meanwhile, when the underground structure according to the embodiment of the present disclosure is buried in a seabed through seawater or freshwater, whether there is scour and a degree of scour can be measured by the electromagnetic wave measurement unit 150.

Referring to FIG. 8, as described above, impedance change points $T_{R1}$ and $T_{R2}$ can be measured according to two impedance change units 140. Due to difference in characteristic impedance between a water section and a soil section below the seabed, a rapid change in characteristic impedance is measured at point $B_1$, enabling the measurement of a boundary surface between the water section and the soil section.

Here, as scour progresses, the change of the boundary surface occurs, and the boundary surface is measured at point $B_2$, and thus it is possible to determine whether there is scour. In addition, based on impedance change points $T_{R1}$ and $T_{R2}$ according to two impedance change units 140, the degree of change in the boundary surface due to scour can be measured, making the accurate measurement of the degree of the scour possible.

Here, as scour progresses, the length of the water section extends from $B_1$ to $B_2$ and the propagation section of electromagnetic waves changes, and thus impedance change points $T_{R1'}$ and $T_{R2'}$ according to the two impedance change units 140 also change. When the position of a new boundary surface is measured on the basis of the impedance change points $T_{R1'}$ and $T_{R2'}$ according to the two impedance change units 140, whether there is scour and the degree of scour can be more accurately measured.

In the embodiment described above, as an example, the measurement cable 130 is disposed inside the tie bar 122. In addition, the measurement cable 130 may be disposed outside the tie bar 122, and may be installed inside and outside the tie bar 122.

Here, the measurement cable 130 and the main reinforcing bar 121 disposed inside or outside the tie bar 122 may constitute a signal transmission line. Alternatively, the combination of a measurement cable 130 disposed inside the tie bar 122 and a measurement cable 130 disposed outside the tie bar 122 may constitute a signal transmission line.

For another example, when the combination of the measurement cable 130 and the main reinforcing bar 121 facing each other relative to the center of the circumference of the underground structure constitutes a signal transmission line, a defect inside the underground structure 100 can also be measured. Likewise, the measurement cables 130 facing each other may constitute a signal transmission line.

In the above-described embodiment, as illustrated in FIG. 6, the impedance change unit 140 has characteristic impedance having a smaller measured value than the measurement cable 130, but may be made of a material with characteristic impedance having a greater measured value than the measurement cable 130. In this case, in the graph illustrated in FIG. 6, the curvatures of the reference points will be measured in the opposite directions.

Meanwhile, FIG. 9 is a graph illustrating the result of a measurement experiment performed by using the device for evaluating integrity of an underground structure by using electromagnetic waves according to the embodiment of the present disclosure. Referring to FIG. 9, it can be seen that a measured value changes at the head of a pile as illustrated in a section P1.

In addition, it can been seen that a measured value changes at the impedance change unit 140 as illustrated in a section P2, that is, at a part at which the first connector 141 and the second connector 142 are coupled to each other, and finally, a measured value changes at the tip of a concrete pile.

Although the embodiments of the present disclosure have been shown and described, those skilled in the art will recognize that modifications can be made to the present embodiments without departing from the principles or spirit of the present disclosure. The scope of the present disclosure will be determined by the appended claims and equivalents thereof.

<Description of the Reference Numerals in the Drawings>

| | |
|---|---|
| 100: Underground structure | 100a, 100b: Unit steel cage |
| 110: Concrete | 121: Main reinforcing bar |
| 121a, 121b: Unit main reinforcing bar | 122: Tie bar |
| 130: Measurement cable | 131, 132: Unit cable |
| 140: Impedance change unit | 141: First connector |
| 142: Second connector | 150: Electromagnetic wave measurement unit |

INDUSTRIAL APPLICABILITY

The device for evaluating integrity of an underground structure of the present disclosure can be applied to evaluate the integrity of an underground structure, such as a pile foundation.

The invention claimed is:

1. A device for evaluating integrity of an underground structure by using electromagnetic waves, the device comprising:
a plurality of main reinforcing bars arranged in a vertical direction in an underground structure;
a plurality of measurement cables extending in the vertical direction to be adjacent to the main reinforcing bars, respectively;
at least one impedance change unit which is provided on each of the measurement cables, is electrically connected to the measurement cable, and has a characteristic impedance different from a characteristic impedance of the measurement cable; and
an electromagnetic wave measurement unit for detecting a change point of a characteristic impedance as a defect point of the underground structure by providing an electromagnetic wave by using, as a signal transmission line, one of the plurality of measurement cables and one of the plurality of main reinforcing bars, or one pair of measurement cables selected from the plurality of measurement cables,
wherein the electromagnetic wave measurement unit determines a defect position in the vertical direction of the defect point by using, as a reference point, a point at which a characteristic impedance is changed by the impedance change unit.

2. The device of claim 1, wherein each of the measurement cables has at least two unit cables, and
the impedance change unit comprises a first connector installed on an end of one unit cable of the unit cables, and a second connector installed on an end of one remaining unit cable of the unit cables, which is connected to the one unit cable, with the second connector being configured to electrically connect the one unit cable and the one remaining unit cable to each other through coupling of the second connector with the first connector.

3. The device of claim 1, wherein the underground structure is buried inside a seabed through seawater or freshwater, and
the electromagnetic wave measurement unit determines a boundary surface between a water section of the seawater or freshwater and a soil section under the seabed by using difference in a characteristic impedance between the water section and the soil section, and determines whether there is scour and a degree of scour on the boundary surface according to a change of the boundary surface on a basis of the reference point.

4. The device of claim 1, further comprising:
a plurality of tie bars which surrounds an outside of the plurality of main reinforcing bars in a circumferential direction and is spaced apart from each other in the vertical direction.

5. The device of claim 4, wherein the underground structure comprises a plurality of unit steel cages disposed in the vertical direction and concrete poured into the plurality of unit steel cages,
wherein each of the unit steel cages comprises a plurality of unit main reinforcing bars disposed in the vertical direction in the underground structure, a plurality of unit tie bars which surrounds an outside of the plurality of unit main reinforcing bars in the circumferential direction and is spaced apart from each other in the vertical direction, and a plurality of unit cables extending in the vertical direction to be adjacent to the unit main reinforcing bars, respectively,
wherein the unit main reinforcing bars at corresponding positions of the unit steel cages neighboring in the vertical direction are connected to each other to constitute the main reinforcing bar; the plurality of unit tie bars constitutes the tie bar; the impedance change unit electrically connects the unit cables at corresponding positions of the unit steel cages neighboring in the vertical direction; and the plurality of unit cables connected to each other in the vertical direction constitutes the one measurement cable.

6. The device of claim 5, wherein the electromagnetic wave measurement unit measures a round-trip travel time of an electromagnetic wave, which is provided through the signal transmission line, reflected and returned from a point at which a characteristic impedance changes and detects the change point of the characteristic impedance.

7. The device of claim 6, wherein the measurement cable is installed inside or outside the tie bar, or both inside and outside the tie bar relative to the circumferential direction.

8. The device of claim 7, wherein a combination of the measurement cable and the main reinforcing bar disposed inside or outside the tie bar, or a combination of the measurement cable disposed inside the tie bar and the measurement cable disposed outside the tie bar constitutes the signal transmission line.

9. The device of claim 7, wherein the measurement cable and the main reinforcing bar or the measurement cables facing each other relative to a center of a circumference of the underground structure constitute the signal transmission line so that integrity inside the underground structure is evaluated.

* * * * *